United States Patent
Lee

(10) Patent No.: US 10,763,519 B2
(45) Date of Patent: Sep. 1, 2020

(54) FUEL CELL STACK AND METHOD OF MANUFACTURING FUEL CELL STACK

(71) Applicant: Hyundai Motor Company, Seoul (KR)

(72) Inventor: Sung Ho Lee, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 398 days.

(21) Appl. No.: 15/353,448

(22) Filed: Nov. 16, 2016

(65) Prior Publication Data
US 2017/0309928 A1    Oct. 26, 2017

(30) Foreign Application Priority Data
Apr. 26, 2016 (KR) .................. 10-2016-0050791

(51) Int. Cl.
| | |
|---|---|
| *H01M 8/0258* | (2016.01) |
| *H01M 8/0254* | (2016.01) |
| *H01M 8/0234* | (2016.01) |
| *H01M 8/04119* | (2016.01) |
| *H01M 8/1018* | (2016.01) |

(52) U.S. Cl.
CPC ....... *H01M 8/0258* (2013.01); *H01M 8/0234* (2013.01); *H01M 8/0254* (2013.01); *H01M 8/04156* (2013.01); *H01M 2008/1095* (2013.01); *H01M 2250/20* (2013.01); *Y02P 70/56* (2015.11); *Y02T 90/32* (2013.01)

(58) Field of Classification Search
CPC ............. H01M 8/0258; H01M 8/0254; H01M 8/04156; H01M 8/0234
See application file for complete search history.

(56) References Cited

U.S. PATENT DOCUMENTS

| | | | |
|---|---|---|---|
| 6,350,540 B1* | 2/2002 | Sugita ................... | H01M 8/023 429/505 |
| 7,374,838 B2* | 5/2008 | Gallagher ............. | H01M 4/861 429/434 |
| 2005/0106450 A1* | 5/2005 | Castro .................. | C25B 11/035 429/480 |

(Continued)

FOREIGN PATENT DOCUMENTS

| | | | | |
|---|---|---|---|---|
| JP | 2005-038738 | * | 2/2005 | ............. H01M 8/02 |
| JP | 2007-234524 A | | 9/2007 | |
| JP | 2008-027672 A | | 2/2008 | |

(Continued)

OTHER PUBLICATIONS

Q.He et al., Novel Gas Diffusion Layers with Separate Gas and Water Pathways for Pemfcs, 227th ECS Meeting, May 24-28, 2015, Chicago, Illinois, USA.

(Continued)

*Primary Examiner* — Helen Oi K Conley
(74) *Attorney, Agent, or Firm* — Morgan, Lewis & Bockius LLP

(57) ABSTRACT

A fuel cell stack includes: a separator comprising channels and lands alternately repeated; and a gas diffusion layer in contact with the separator for transferring gas to a membrane-electrode assembly. The gas diffusion layer has a fiber arrangement structure having a predetermined directionality beneath the lands adjacent to opposite lateral sides of the channels based on a central portion of the channels to guide a transfer passage of the gas.

10 Claims, 3 Drawing Sheets

(56) References Cited

U.S. PATENT DOCUMENTS

2005/0175888 A1* 8/2005 Sasahara ............. H01M 4/8605
429/482
2005/0233203 A1* 10/2005 Hampden-Smith ...... B01J 21/18
429/482

FOREIGN PATENT DOCUMENTS

| | | |
|---|---|---|
| JP | 2009-224279 A | 10/2009 |
| JP | 2011-070991 A | 4/2011 |
| KR | 10-2008-0045417 A | 5/2008 |
| KR | 10-2011-0062360 A | 6/2011 |
| KR | 10-1142908 B1 | 5/2012 |
| KR | 10-2012-0131350 A | 12/2012 |
| KR | 10-2013-0057716 A | 6/2013 |
| KR | 10-2015-0126742 A | 11/2015 |

OTHER PUBLICATIONS

Korean Office Action issued in corresponding Korean Patent Application No. 10-2016-0050791, dated Dec. 13, 2017, with English Translation.

* cited by examiner

FUEL CELL STACK AND METHOD OF MANUFACTURING FUEL CELL STACK

CROSS-REFERENCE TO RELATED APPLICATION

This application claims the benefit of priority to Korean Patent Application No. 10-2016-0050791, filed on Apr. 26, 2016 in the Korean Intellectual Property Office, the entirety of which is incorporated herein by reference.

TECHNICAL FIELD

The present disclosure relates to a fuel cell stack and a method of manufacturing the fuel cell stack, and more particularly, to a fuel cell stack including a gas diffusion layer having a directional wave pattern capable of smoothly performing gas diffusion and water discharge, and a method of manufacturing the fuel cell stack.

BACKGROUND

Generally, a fuel cell stack mounted in a fuel cell vehicle includes a plurality of stacked fuel cells. The fuel cell stack is an apparatus for the generation of electricity through the electrochemical reaction of hydrogen and oxygen while producing water.

In this case, each unit cell of the fuel cell stack includes a membrane-electrode assembly (MEA), which is disposed in the middle thereof. The MEA includes a polymer electrolyte membrane, and catalyst layers coated on both sides of the polymer electrolyte membrane which function as an anode electrode and a cathode electrode, respectively.

Furthermore, gas diffusion layers (GDLs) are disposed on the outer sides of the MEA, that is, outside of the catalyst layers. Separators are disposed outside of the gas diffusion layers while including channels to supply gas to the reaction, and to discharge water produced by the reaction.

As a result, the unit cell of the fuel cell may include one MEA, two GDLs, and two separators. Furthermore, several tens to several hundred unit cells may be stacked to constitute a fuel cell having a desired scale.

In the unit cell of such a fuel cell, each GDL should allow gas to be uniformly transferred to the MEA while allowing water produced at the MEA to be smoothly discharged through the channels.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in view of the above problems, and it is an object of the present disclosure to provide a fuel cell stack, in which a fiber arrangement structure of a gas diffusion layer has a directional wave pattern, thereby allowing for gas to be smoothly transferred through channels toward regions beneath lands while guiding water produced at a membrane-electrode assembly to be smoothly discharged from the regions beneath the lands to the channels, and a method of manufacturing the fuel cell stack.

In accordance with one aspect of the present disclosure, the above and other objects can be accomplished by the provision of a fuel cell stack including a separator comprising alternately repeated channels and lands, and a gas diffusion layer contacting the separator for transferring gas to a membrane-electrode assembly, wherein the gas diffusion layer is formed to have a fiber arrangement structure having a predetermined directionality beneath the lands adjacent to opposite lateral sides of each channel based on a central portion of the channel to guide gas to a transfer passage.

In an exemplary embodiment, the gas diffusion layer may guide water produced at the membrane-electrode assembly through the transfer passages to be discharged toward the channels.

In another exemplary embodiment, the gas diffusion layer may have greater porosity in regions beneath the lands than in regions beneath the channels.

In still another exemplary embodiment, the gas diffusion layer may have greater porosity in a region facing the separator than in a region facing the membrane-electrode assembly.

In yet another exemplary embodiment, the gas diffusion layer may have greater porosity in regions beneath the lands than porosity in regions beneath the channels, and the gas diffusion layer may have greater porosity in a region facing the separator than in a region facing the membrane-electrode assembly.

In still yet another exemplary embodiment, the gas diffusion layer may have greater porosity in regions beneath the lands than porosity in regions beneath the channels, the gas diffusion layer may have greater porosity in a region facing the separator than in a region facing the membrane-electrode assembly, and the gas diffusion layer may have smaller porosity at an inlet side of the channels than at an outlet side of the channels.

In another further exemplary embodiment, the gas diffusion layer may be coupled to the separator to form an integrated structure.

In still another further exemplary embodiment, the gas diffusion layer may have a powder-bonded structure.

In accordance with another aspect of the present disclosure, there is provided a method of manufacturing a fuel cell stack including a separator comprising alternately repeated channels and lands, and a gas diffusion layer contacting the separator for transferring gas to a membrane-electrode assembly, the method including coupling the gas diffusion layer to the separator using a powder injection process or a three dimensional printing process to form an integrated structure.

Other aspects and exemplary embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other aspects of the present disclosure will now be described in detail with reference to certain exemplary embodiments thereof, and illustrated by the accompanying drawings which are given herein by way of illustration only, and thus are not limitative of the present invention, and wherein.

Figure 1:
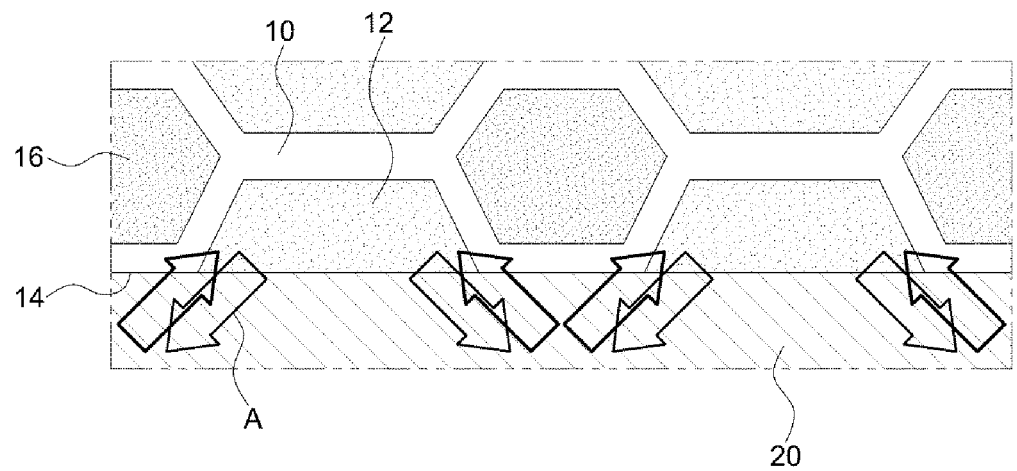
FIG. 1 is a view illustrating flow paths of gas and water in a fuel cell stack according to a first embodiment in the present disclosure.

It should be understood that the appended drawings are not necessarily to scale, presenting a somewhat simplified representation of various features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EMBODIMENTS

Hereinafter, the present invention will be described in detail with reference to the accompanying drawings to allow those skilled in the art to easily practice the present invention.

However, the present invention is not limited to the embodiments disclosed herein, but may be implemented in various different forms. The embodiments are merely given to make the disclosure of the present invention to perfect and to perfectly instruct the scope of the invention to those skilled in the art, and the present invention should be defined by the scope of claims.

In addition, in the description of the present invention, a detailed description of related known technologies and the like will be omitted when it is judged to make the subject of the present invention unclear.

Figure 2:
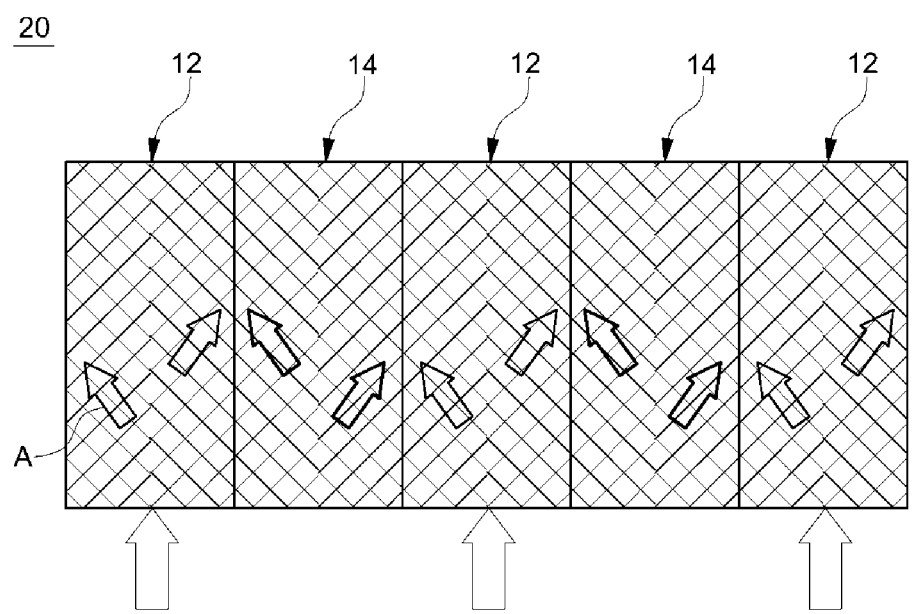
FIG. 2 is a view illustrating a structure of a gas diffusion layer in the fuel cell stack according to the first embodiment.

FIG. 1 is a view illustrating flow paths of gas and water in a fuel cell stack according to a first embodiment in the present disclosure. FIG. 2 is a view illustrating a structure of a gas diffusion layer in the fuel cell stack according to the first embodiment.

As illustrated in FIG. 1, generally, the fuel cell stack includes a separator 10 including channels 12 and lands 14 alternately repeated, and a gas diffusion layer 20 for transferring gas to a membrane-electrode assembly while contacting the separator 10.

In this case, the gas diffusion layer 20 may be formed to have a fiber arrangement structure having a predetermined directionality beneath the lands 14 adjacent to opposite lateral sides of the channels 12 based on a central portion of the channels 12, thereby guiding gas to transfer passages A.

For example, the gas diffusion layer 20 may be formed of a porous carbon fiber assembly having contractibility. Since such a porous carbon fiber assembly is manufactured to have a fiber arrangement structure having a predetermined directionality, gas passing through the channels 12 moves in a diagonal direction beneath the lands 14 adjacent to the opposite lateral sides of each channel 12, as indicated by an arrow illustrated in FIG. 1, and then gas is transferred to the membrane-electrode assembly.

In the related art, the gas diffusion layer 20 is not manufactured to have a fiber arrangement structure having a predetermined directionality, differently from the illustrated embodiment. In such a case, when gas passing through the channels 12 is transferred to the membrane-electrode assembly through the gas diffusion layer 20, gas may not smoothly pass through regions beneath the lands 14, as compared to regions beneath the channels 12.

Accordingly, as illustrated in FIG. 2, the gas diffusion layer 20 according to the illustrated embodiment is formed to have a patterned structure having a directional wave pattern, thereby guiding the transfer passages A of gas to be transferred to the membrane-electrode assembly. Thus, gas passing through the channels 12 may be smoothly transferred toward the regions beneath the lands 14.

Furthermore, the gas diffusion layer 20 may guide water produced at the membrane-electrode assembly to be discharged to the channels 12 through the above-described transfer passages A.

That is, since water produced upon electrochemical reaction in the membrane-electrode assembly interferes with transfer of gas to the catalyst layer, the produced water should be discharged toward the channels 12 through the gas diffusion layer 20.

In terms of water discharge, a fuel cell stack including a general gas diffusion layer 20 may not smoothly discharge water at the regions beneath the lands 14, as compared to the regions beneath the channels 12 due to the structural characteristics of the fuel cell stack.

To this end, in this embodiment as described above, the gas diffusion layer 20 has the fiber arrangement structure having the directional wave pattern to form the transfer passages A and, as such, water may be discharged toward the channels 12 through the transfer passages A.

In this case, the transfer passages A are formed to extend in a direction indicated by the arrows illustrated in FIGS. 1 and 2. Since the gas diffusion layer 20 guides gas and water to move in directions opposite to each other through the above-described transfer passages A, the supply of gas beneath the lands 14 and the discharge of water beneath the lands 14 may be smoothly performed.

In addition, the gas diffusion layer 20 may have a powder-bonded structure, and may be coupled to the separator 10 to form an integrated structure.

That is, a unit fuel cell may be formed by coupling a pair of separators 10 to form an integrated structure defining the channels 12 and coolant channels 16 for anode and cathode electrodes facing each other, and then coupling gas diffusion layers 20 to upper and lower sides of the separators 10, respectively, to form an integrated structure.

Such an integrated structure of the separators 10 and diffusion layers 20 is formed using a three dimensional (3D) printer. Unlike a general manufacturing method, in which a pair of separators 10 is assembled by surface pressure under the condition that a gasket is interposed between the separators 10 to form coolant channels 16, the integrated unit fuel cell is manufactured using the 3D printer without a gasket and surface pressure to maintain a desired shape of the unit cell.

In this case, detailed processes for manufacturing the integrated unit cell of the fuel cell using the 3D printer are publicly known, and thus a detailed description thereof will be omitted.

As the unit cell of the fuel cell is manufactured by the above-described method, various types of flow paths may be formed without limitation encountered in the case in which a fuel cell is manufactured using a mold. Furthermore, the integrated unit cell is manufactured using the 3D printer, thereby being capable of effectively preventing voltage loss due to contact resistance.

Figure 3:
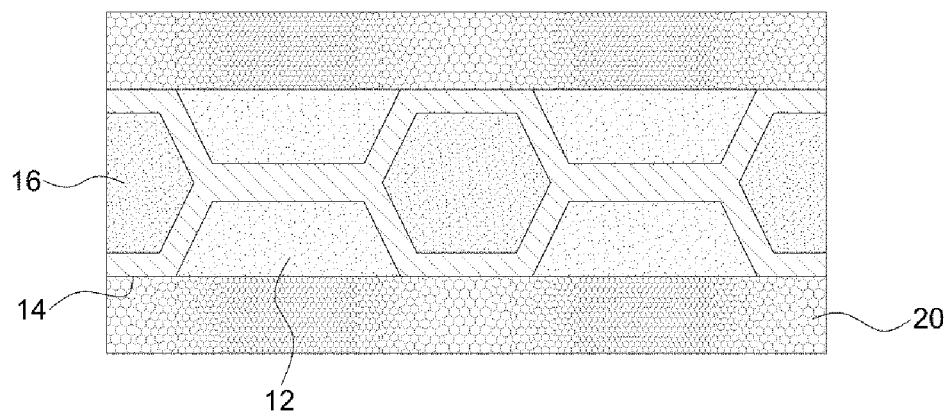
FIG. 3 is a view illustrating a structure of the gas diffusion layer in the fuel cell stack according to a second embodiment in the present disclosure.

Hereinafter, FIG. 3 is a view illustrating a structure of the gas diffusion layer in the fuel cell stack according to a second embodiment in the present disclosure.

As illustrated in FIG. 3, the gas diffusion layer 20 of the illustrated embodiment has greater porosity in regions beneath the lands 14 than porosity in regions beneath the channels 12.

When gas passing through the channels 12 is transferred to the membrane electrode assembly through the gas diffusion layer 20, it may be possible to smoothly transfer gas passing through the channels 12 to regions beneath the lands 14 because porosity in the regions beneath the lands 14 in the gas diffusion layer 20 is greater than porosity in the regions beneath the channels 12 in the gas diffusion layer 20.

When porosity in the regions beneath the lands 14 is the same as porosity in the regions beneath the channels 12, gas may not be smoothly transferred at the regions beneath the lands 14 due to the regions beneath the lands 14 covered by the lands 14, as compared to the region beneath the channels 12.

Accordingly, in this embodiment, there is a porosity difference between the regions beneath the lands 14 and the regions beneath the channels 12 in the gas diffusion layer 20, and, as such it may be possible to uniformly distribute and transfer gas to the membrane-electrode assembly.

Figure 4:
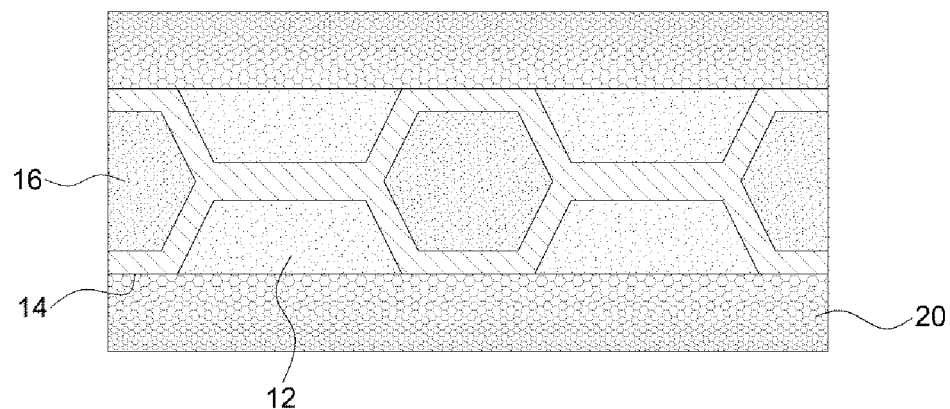
FIG. 4 is a view illustrating a structure of the gas diffusion layer in the fuel cell stack according to a third embodiment in the present disclosure.

FIG. 4 is a view illustrating a structure of the gas diffusion layer in the fuel cell stack according to a third embodiment in the present disclosure.

As illustrated in FIG. 4, the gas diffusion layer 20 of the illustrated embodiment has greater porosity in regions facing the lands 14 and channels 12 than porosity in a region facing the membrane-electrode assembly.

When porosity is gradually increased from the region facing the membrane-electrode assembly to the region facing the separator including the lands 14 and channels 12, water discharged from the membrane-electrode assembly is smoothly transferred to the separator including the channels 12 through the gas diffusion layer 20 by the porosity difference.

When the gas diffusion layer 20 has uniform porosity, water produced at the membrane-electrode assembly may be discharged to the channels, but discharge performance may be degraded.

Accordingly, when there is a porosity difference between the region facing the membrane-electrode assembly and the regions facing the lands 14 and channels 12, water may be smoothly discharged toward the channels 12.

Figure 5:
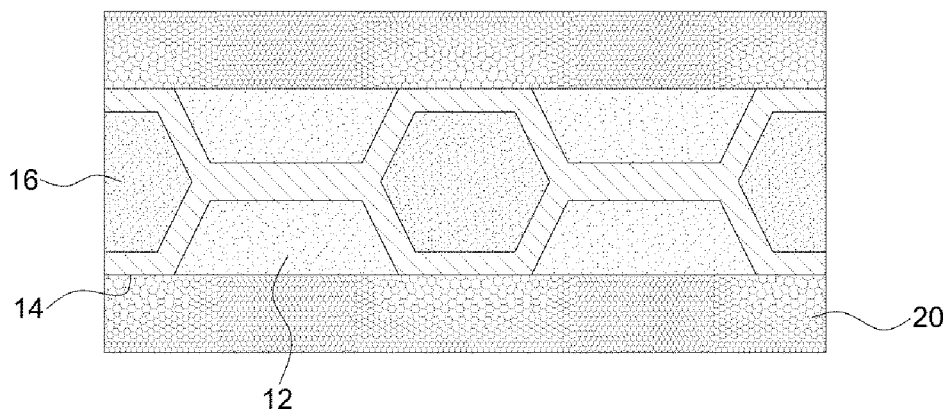
FIG. 5 is a view illustrating a structure of the gas diffusion layer in the fuel cell stack according to a fourth embodiment in the present disclosure.

Hereinafter, FIG. 5 is a view illustrating a structure of the gas diffusion layer in the fuel cell stack according to a fourth embodiment of the present invention.

As illustrated in FIG. 5, the gas diffusion layer 20 has greater porosity in the regions beneath the lands 14 than porosity in the regions beneath the channels 12. Additionally, the gas diffusion layer 20 has greater porosity in the regions facing the lands 14 and channels 12 than porosity in the region facing the membrane-electrode assembly.

In this embodiment, the gas diffusion layer 20 is formed through combination of the structures of the above-described second and third embodiments. As a result, when gas is supplied to the membrane-electrode assembly, gas may be smoothly transferred to the regions beneath the lands 14 due to a porosity difference of the gas diffusion layer 20 as described above. At the same time, water produced at the membrane-electrode assembly may be effectively discharged through the channels 12.

Figure 6A:
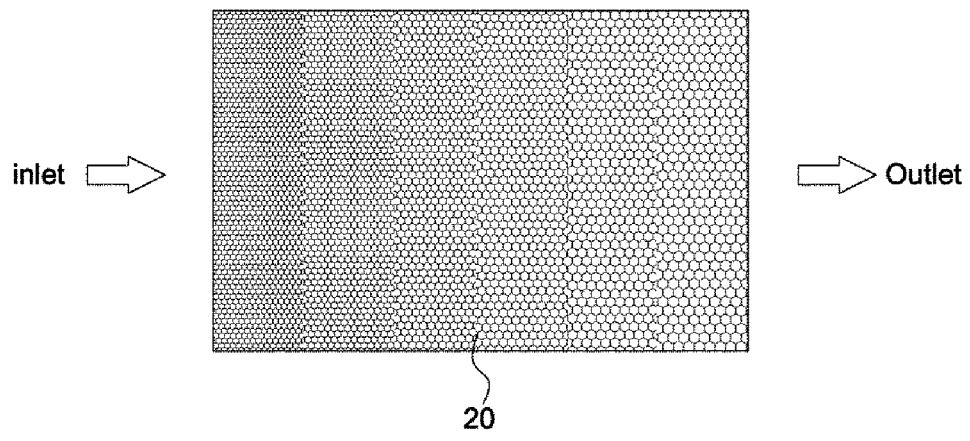
FIG. 6A is a view illustrating the gas diffusion layer according to a fifth embodiment in the present disclosure.
Figure 6B:
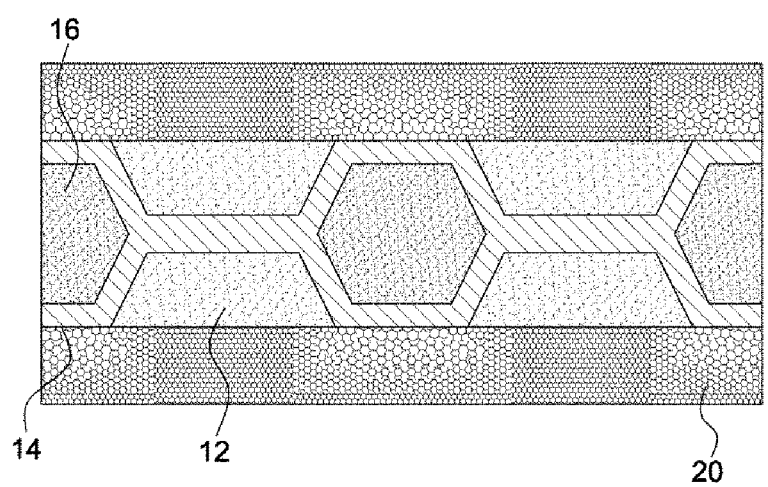
FIG. 6B is a view illustrating the gas diffusion layer as arranged in the fuel cell stack according to the fifth embodiment in the present disclosure.

Hereinafter, FIG. 6A is a view illustrating the gas diffusion layer according to a fifth embodiment in the present disclosure, and FIG. 6B is a view illustrating the gas diffusion layer as arranged in the fuel cell stack according to the fifth embodiment in the present disclosure.

As illustrated in FIG. 6B, the gas diffusion layer 20 has greater porosity in the regions beneath the lands 14 than the regions beneath the channels 12. Additionally, the gas diffusion layer 20 has greater porosity in the regions facing the lands 14 and channels 12 than porosity in the region facing the membrane-electrode assembly. In addition, the gas diffusion layer 20 has smaller porosity at an inlet side of the channels 12 than porosity at an outlet side of the channels 12.

In this case, characteristics of the gas diffusion 20 that the gas diffusion 20 has greater porosity in the regions beneath the lands 14 greater than in the regions beneath the channels 12, and has greater porosity in the regions facing the lands 14 and channels 12 than porosity in the region facing the membrane-electrode assembly, are the same as the above-described characteristics in the fourth embodiment, and a detailed description thereof will thus be omitted.

As illustrated in FIG. 6A, the gas diffusion layer 20 according to the present exemplary embodiment has smaller porosity at the inlet side of the channel 12 that corresponds to the left side of FIG. 6A than porosity at the outlet side of the channel 12 that corresponds to the right side of FIG. 6A. As illustrated in FIG. 6A, due to the difference in porosity, gas concentration at the inlet side of each channel 12 to which gas is supplied in the direction of the arrow is high, and gas concentration at the outlet side of each channel 12 is low since gas flows in a longitudinal direction at the outlet side.

Accordingly, concentration of gas transferred from the channels 12 to the gas diffusion layer 20 is lowered from the inlet side to the outlet side. To this end, the gas diffusion layer 20 according to the illustrated embodiment is formed to have a porosity difference and, as such, gas may quickly move at the inlet side. Thus, gas may effectively move to the outlet side while having a relatively uniform concentration and, as such, may be transferred to the membrane-electrode assembly.

As apparent from the above description, in accordance with exemplary embodiments in the present disclosure, the fiber arrangement structure of the gas diffusion layer may have a directional wave pattern and, therefore, gas passing through the channels may be smoothly transferred beneath the lands while water produced at a membrane-electrode assembly may be smoothly discharged from beneath the lands to the channels.

Additionally, the gas diffusion layer has different porosities in different regions thereof, thereby improving gas diffusion performance and water discharge performance.

Furthermore, two separators and two gas diffusion layers facing respective separators may be integrally formed using a three-dimensional (3D) printer and, as such, it may be possible to prevent voltage loss caused by contact resistance.

Although exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A fuel cell stack comprising:
   a separator comprising channels and lands alternately repeated; and
   a gas diffusion layer in contact with the separator for transferring gas to a membrane-electrode assembly,
   wherein the gas diffusion layer has a fiber arrangement structure having a predetermined directionality beneath the lands, the lands being adjacent to opposite lateral sides of the channels with respect to a central portion of the channels to guide a transfer passage of the gas,
   each region beneath the lands and the channels includes the fiber arrangement structure, and
   a porosity of the fiber arrangement structure in regions beneath the lands is greater than a porosity of the fiber arrangement structure in regions beneath the channels.

2. The fuel cell stack according to claim 1, wherein the gas diffusion layer guides water produced at the membrane-electrode assembly through the transfer passage to be discharged toward the channels.

3. The fuel cell stack according to claim 1, wherein the gas diffusion layer has greater porosity in a region facing the separator than in a region facing the membrane-electrode assembly.

4. The fuel cell stack according to claim 1, wherein the gas diffusion layer has greater porosity in the regions beneath the lands than in the regions beneath the channels, and
   the gas diffusion layer has greater porosity in a region facing the separator than in a region facing the membrane-electrode assembly.

5. The fuel cell stack according to claim 1, wherein the gas diffusion layer has greater porosity in the regions beneath the lands than in the regions beneath the channels,
   the gas diffusion layer has greater porosity in a region facing the separator than in a region facing the membrane-electrode assembly, and
   the gas diffusion layer has smaller porosity at an inlet side of the channels than at an outlet side of the channels.

6. The fuel cell stack according to claim 1, wherein the gas diffusion layer is coupled to the separator to form an integrated structure.

7. The fuel cell stack according to claim 1, wherein the gas diffusion layer has a powder-bonded structure.

8. A fuel cell stack comprising:
   a separator comprising channels and lands alternately repeated; and
   a gas diffusion layer in contact with the separator for transferring gas to a membrane-electrode assembly,
   wherein the gas diffusion layer has a fiber arrangement structure having a directional wave pattern allowing gas to flow in a diagonal way with respect to the lands, the lands being adjacent to opposite lateral sides of the channels,
   each region beneath the lands and the channels includes the fiber arrangement structure, and
   a porosity of the fiber arrangement structure in regions beneath the lands is greater than a porosity of the fiber arrangement structure in regions beneath the channels.

9. The fuel cell stack according to claim 1, wherein the fuel cell stack is configured such that water produced at the membrane-electrode assembly at the regions beneath the lands is discharged toward a top of the channels through a directional wave pattern of the gas diffusion layer in a stacking direction of the fuel cell stack.

10. The fuel cell stack according to claim 8, wherein the fuel cell stack is configured such that water produced at the membrane-electrode assembly at the regions beneath the lands is discharged toward a top of the channels through the directional wave pattern of the gas diffusion layer in a stacking direction of the fuel cell stack.

* * * * *